US007010072B2

(12) United States Patent
Lee et al.

(10) Patent No.: US 7,010,072 B2
(45) Date of Patent: Mar. 7, 2006

(54) ALIGNED CLOCK FORWARDING SCHEME

(75) Inventors: Ming-Hsien Lee, Hsinchu (TW); Tsan-Hui Chen, Hsinchu (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 693 days.

(21) Appl. No.: 10/052,113

(22) Filed: Jan. 17, 2002

(65) Prior Publication Data

US 2003/0133528 A1 Jul. 17, 2003

(51) Int. Cl.
*H04L 7/00* (2006.01)

(52) U.S. Cl. ..................................... 375/354

(58) Field of Classification Search ................ 375/211, 375/214, 215, 354, 371, 373, 355; 327/164, 327/201, 291, 385, 386

See application file for complete search history.

(56) References Cited

U.S. PATENT DOCUMENTS

| 5,115,455 | A | * | 5/1992 | Samaras et al. | 375/354 |
| 5,359,630 | A | * | 10/1994 | Wade et al. | 375/354 |
| 6,738,417 | B1 | * | 5/2004 | Kim et al. | 375/220 |
| 6,751,743 | B1 | * | 6/2004 | Theodoras, II et al. | 713/400 |

* cited by examiner

*Primary Examiner*—Robert Pascal
*Assistant Examiner*—Krista Flanagan

(57) ABSTRACT

An aligned clock forwarding scheme of an electronic system includes a first circuit path generating an aligned clock output signal to a subsystem and a second circuit path generating an aligned data signal to the subsystem. An external clock input serves as the source of the clock signal for the aligned clock forwarding scheme. A multiplication circuit receives the external clock input and sends multiplied clock signals to control the first and second circuit paths. The two circuit paths have the same physical characteristics so that both clock output and data signals experience the same environmental effect. There is no additional skew incurred between the clock and data signals during the data transfer between the two subsystems.

10 Claims, 9 Drawing Sheets

(PARIOR ART)

(PARIOR ART)

ALIGNED CLOCK FORWARDING SCHEME

FIELD OF THE INVENTION

The present invention generally relates to the design of an electronic system, and more specifically to the design of the clock scheme in a computer or electronic system.

BACKGROUND OF THE INVENTION

In an electronic system, subsystems communicate with one another by transferring data among them in order to maintain the normal operation of the whole system. Almost all the modern electronic systems have sequential circuits that require an input clock for these systems to function properly. The source of the input clock for each subsystem may or may not be the same.

When data or a signal is transmitted from one subsystem to another subsystem, the transferred signal and the input clock entering the receiving subsystem usually have to comply with some requirements in timing. For example, these signals must be aligned when they arrive at the receiving subsystem. The relationship in timing is specified in the datasheet of various subsystems such as DRAM specification or PCI bus specification.

With reference to FIG. 1, a conventional electronic system with two subsystems is illustrated. A clock generator 100 provides clock inputs CK1 and CK2 to a first subsystem 101 and a second subsystem 102 respectively. As shown in FIG. 1, the two clock inputs CK1 and CK2 have different paths in the system. In the electronic system, data are transferred from the first subsystem 101 to the second subsystem 102.

Because of the path difference, some environmental factors may affect the timing relationship between CK1 and CK2. For example, the trace length of the clock input CK1 to the first subsystem 101 may be longer than the trace length of the clock input CK2. The signal driving capability of the first subsystem 101 can also be different from that of the clock generator 100, and the leaving time of the clock input from the clock generator 100 may be different from that of the data sent from the first subsystem 101 to the second subsystem 102. Consequently, CK1 has a clock skew with respect to CK2 as illustrated in FIG. 2. When the second subsystem samples the transferred data, incorrect data may be received as a result of the skew.

In general, there are two important timing requirements to be met in the clock and data signals of an electronic system. One is setup time and the other is hold time. Two possible data transactions with output delays are shown in FIG. 2, i.e., Data with output delay I and Data with output delay II, respectively. While one meets both setup and hold time requirement, the other violates the timing requirement.

How to satisfy the timing requirement plays an important role in designing modern electronic systems. In a computer system, increasing operation frequency is an effective approach to providing more operation power and higher performance. As the higher operation frequency is used and a cycle time is shortened, it becomes more and more difficult to meet the AC conditions of signals transferred among the computer subsystems. The timing relationship between the input clock and the transferred data is one of the AC conditions that have to be satisfied.

SUMMARY OF THE INVENTION

This invention has been made to meet the above-mentioned requirement in timing relationship of signals and clocks in a computer or electronic system. The primary object of this invention is to provide a clock scheme so that the timing relationship between clocks and data or signals in a system having multiple subsystems can be well controlled.

Accordingly, an aligned clock forwarding scheme is provided in this invention to maintain the timing relationship between an input clock and a transferred data signal. Within a first subsystem, the aligned forwarding scheme includes a first circuit path generating an aligned clock output signal sent to a second subsystem and a second circuit path generating an aligned data signal to the second subsystem. An external clock input serves as the clock signal for the aligned clock forwarding scheme.

The two circuit paths have identical circuit components so that they have the same physical characteristics. Each circuit path comprises a D flip-flop and an output buffer. A clock multiplication circuit receives the external clock input and generates multiplied clock signals to control the D flip-flops of both first and second circuit paths. Both clock output and data signal experience the same environmental effect to avoid any additional skew. An inverter may also be used to generate a clock output with an inverse phase if necessary.

The foregoing and other objects, features, aspects and advantages of the present invention will become better understood from a careful reading of a detailed description provided herein below with appropriate reference to the accompanying drawings.

DETAILED DESCRIPTION OF THE INVENTION

Figure 1:
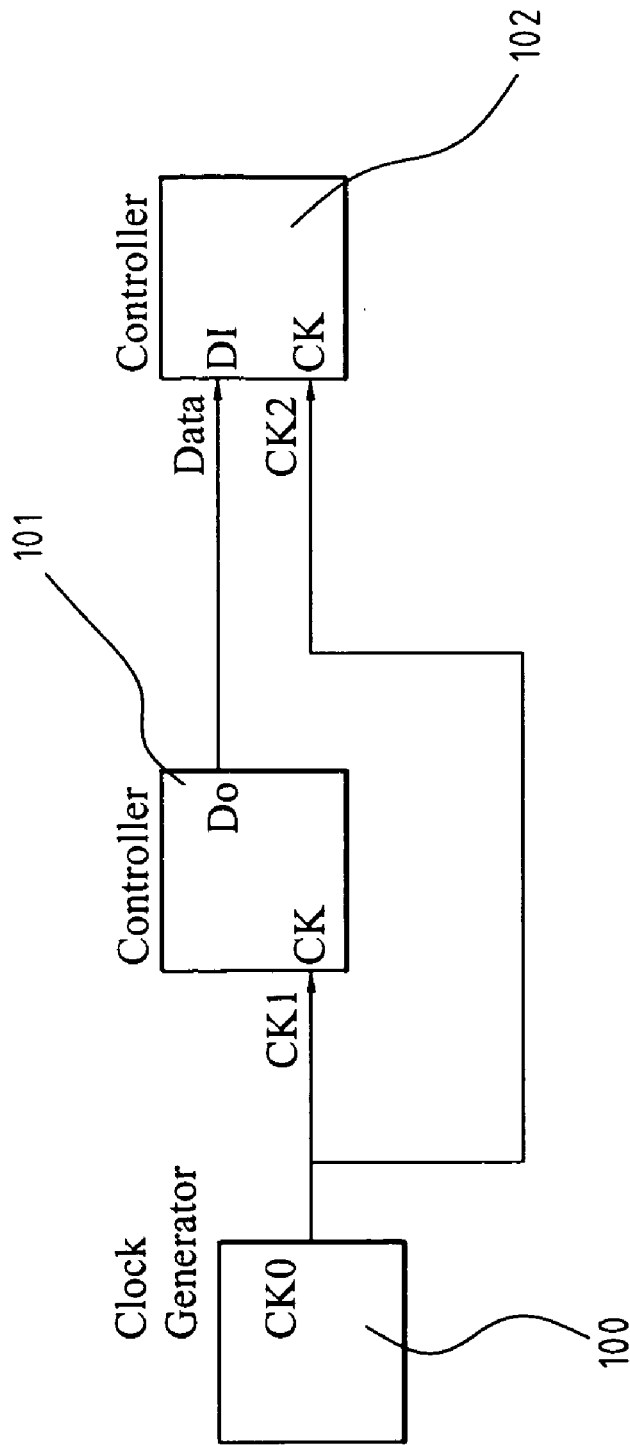
FIG. 1 shows a conventional electronic system in which the clock inputs of two subsystems are provided by the same clock generator.
Figure 2:
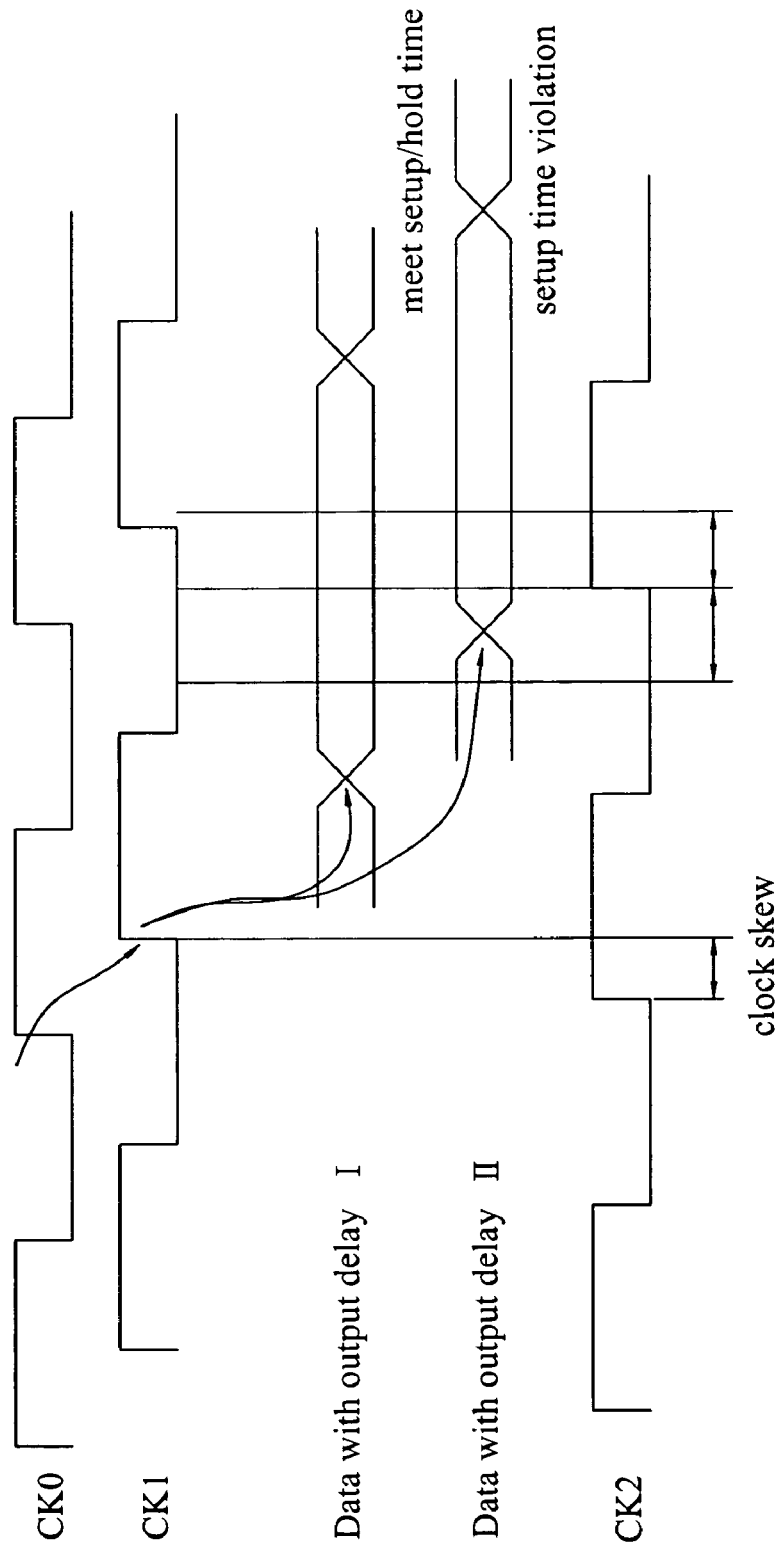
FIG. 2 shows the timing relationships between the transferred data and the clock signals of the subsystems in the conventional system shown in FIG. 1.
Figure 3:
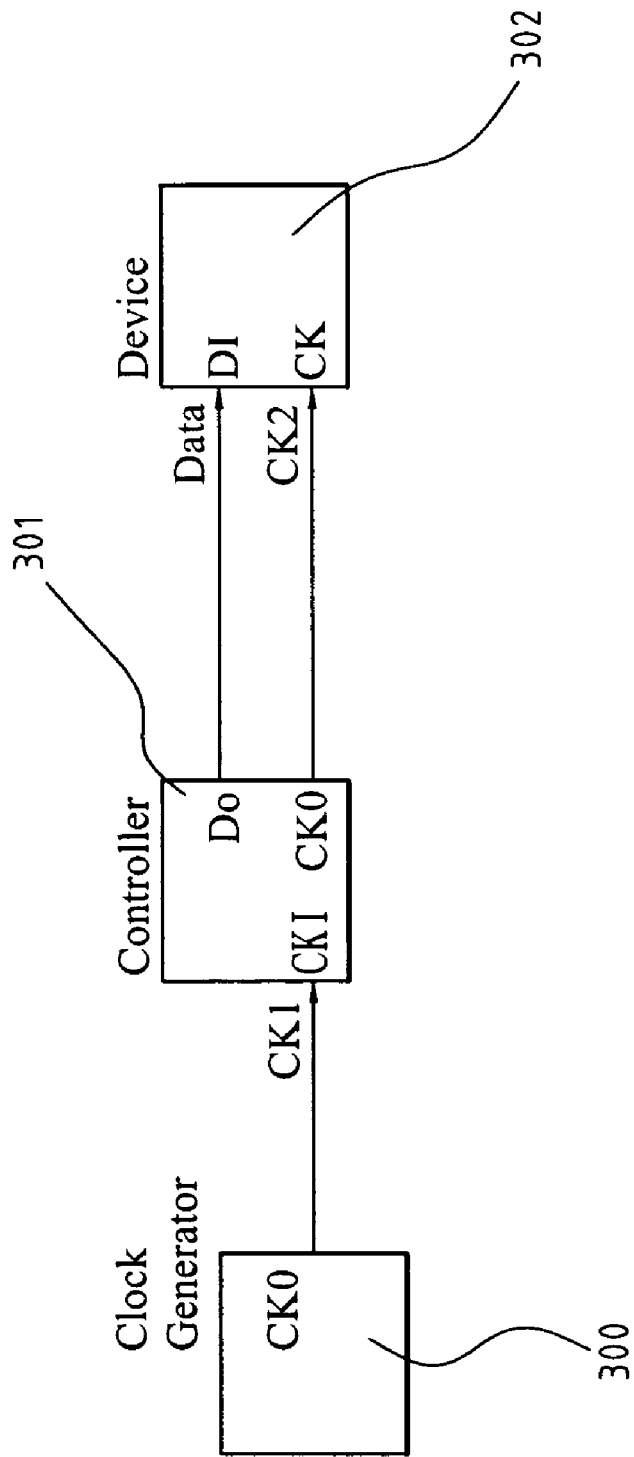
FIG. 3 shows an electronic system designed with the aligned clock forwarding scheme according to the present invention.

With reference to FIG. 3, the present invention provides an aligned clock forwarding scheme to overcome the problem associated with the timing difference of input clocks in different subsystems of an electronic system. A clock generator 300 provides a clock input CK1 to a first subsystem 301. The first subsystem 301 then provides a clock input CK2 to the second subsystem 302. In the electronic system, data is also transferred from the first subsystem 301 to the second subsystem 302. The clock input CK2 and the data are properly aligned so as to meet the timing specification.

Figure 4:
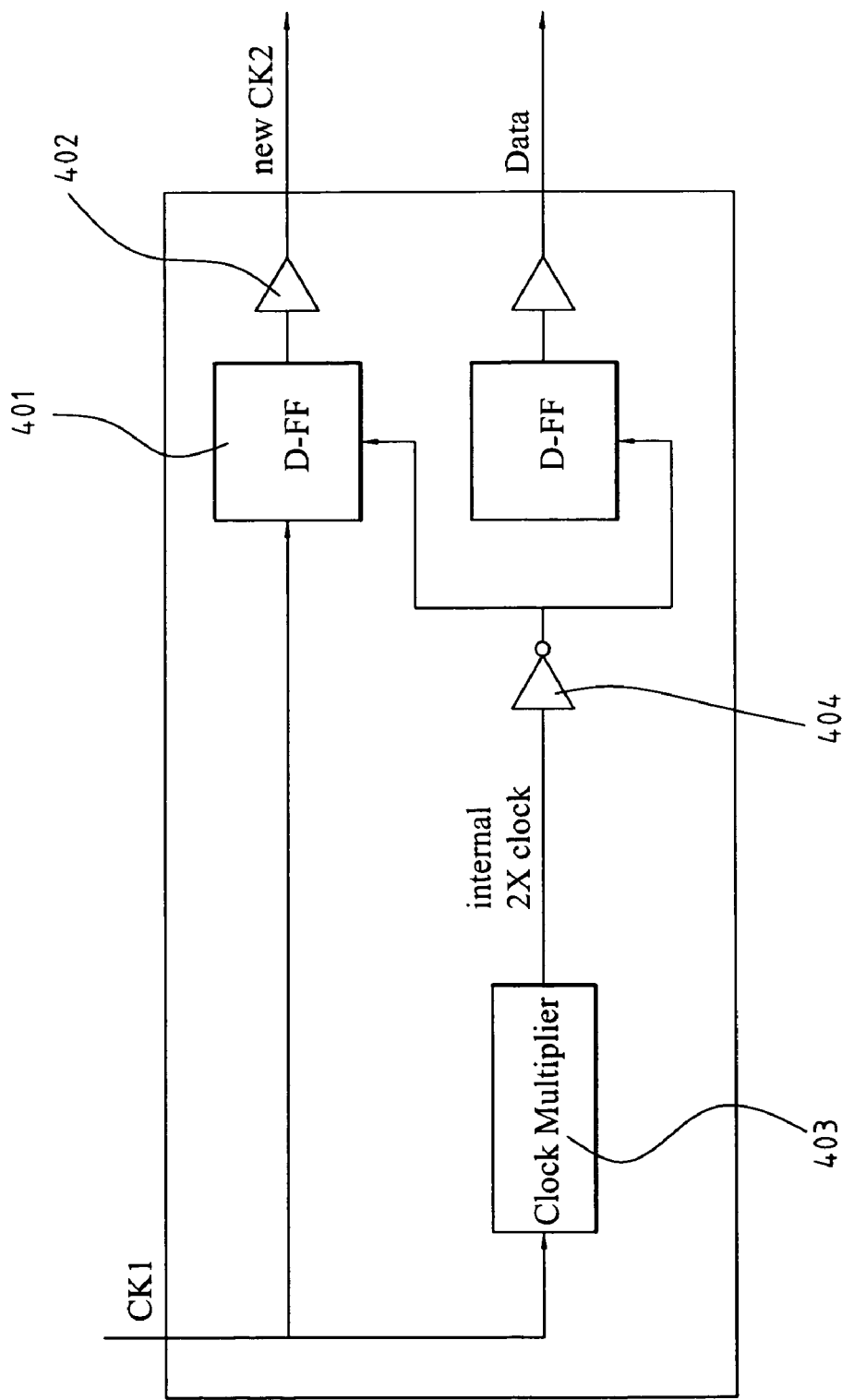
FIG. 4 shows a simplified circuit diagram for the aligned clock forwarding scheme in which the internal data paths of data and aligned clock have mirrored structures inside the subsystem.

FIG. 4 shows a simplified circuit diagram for implementing the aligned clock forwarding scheme according to this invention. As can be seen, the output paths of both data and CK2 are identical. The output path comprises a D flip-flop 401 and an output buffer 402. In this scheme, both trace length and driving capability for the clock input CK2 and the data to the second subsystem 302 are the same. Therefore, the leaving time of the clock input and data signals can be well controlled. The simplified circuit also comprises a clock multiplication circuit for generating multiplied clock signals to control the D flip-flops in the output paths of both data and CK2. The clock multiplication circuit includes a clock multiplier 403 and an inverter 404 as shown in FIG. 4.

Figure 5:
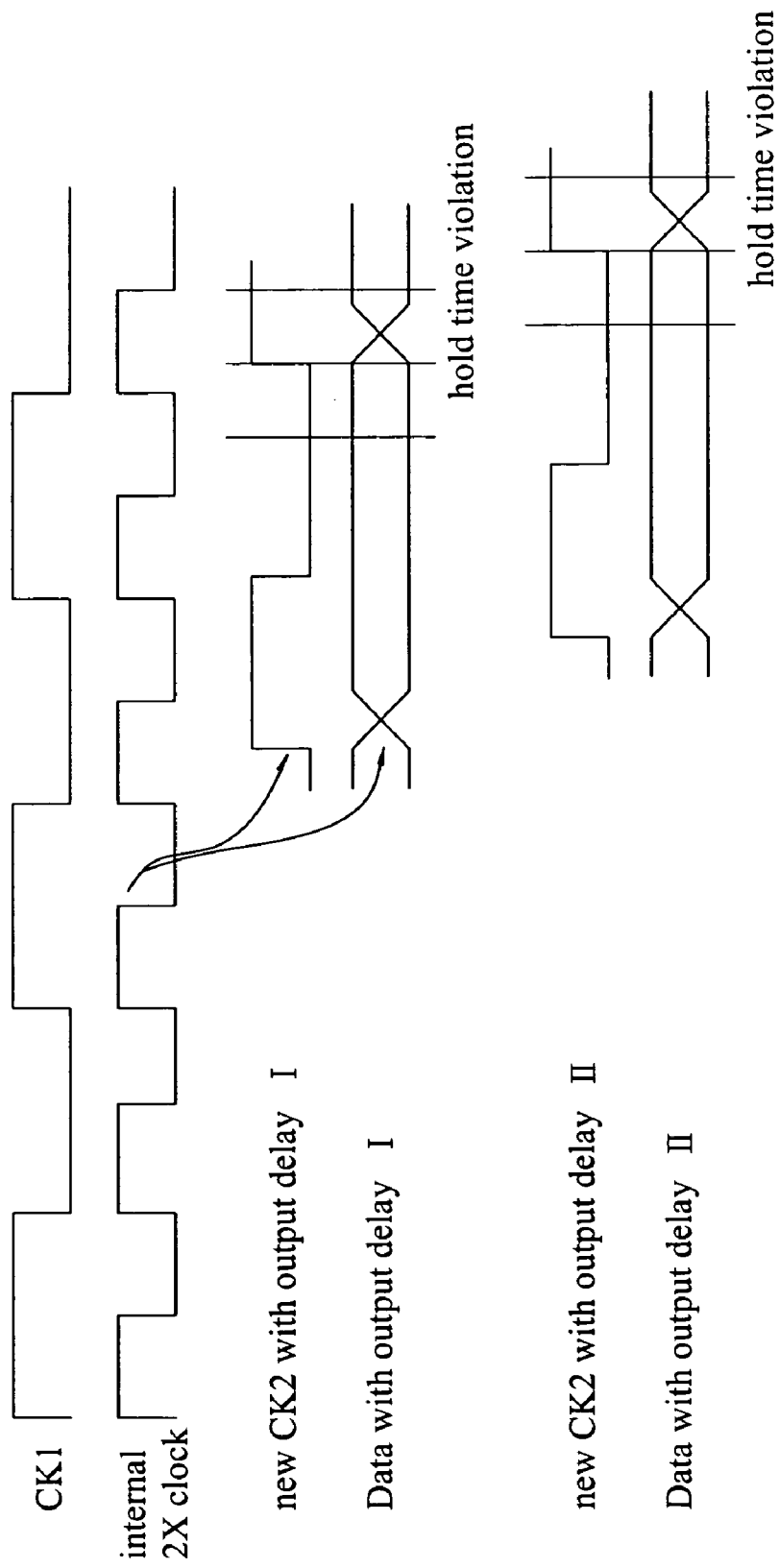
FIG. 5 shows the timing relationships between the transferred data and clock signals of the circuit diagram shown in FIG. 4.

The flip-flop delay, output buffer delay and trace length of the clock input and data are the same and mirrored as one architecture shown in FIG. 4. The timing relationship between the clock input CK2 and data is shown in FIG. 5. With the aligned clock forwarding scheme shown in FIG. 4, the timing can be well maintained and the setup time violation can be effectively eliminated. However, the hold time violation may still occur under this architecture as illustrated in FIG. 5. Two possible data transactions with output delays are shown, i.e., Data with output delay I and Data with output delay II, respectively. Although the setup time requirement is met, both of them violate the hold time requirement.

Figure 6:
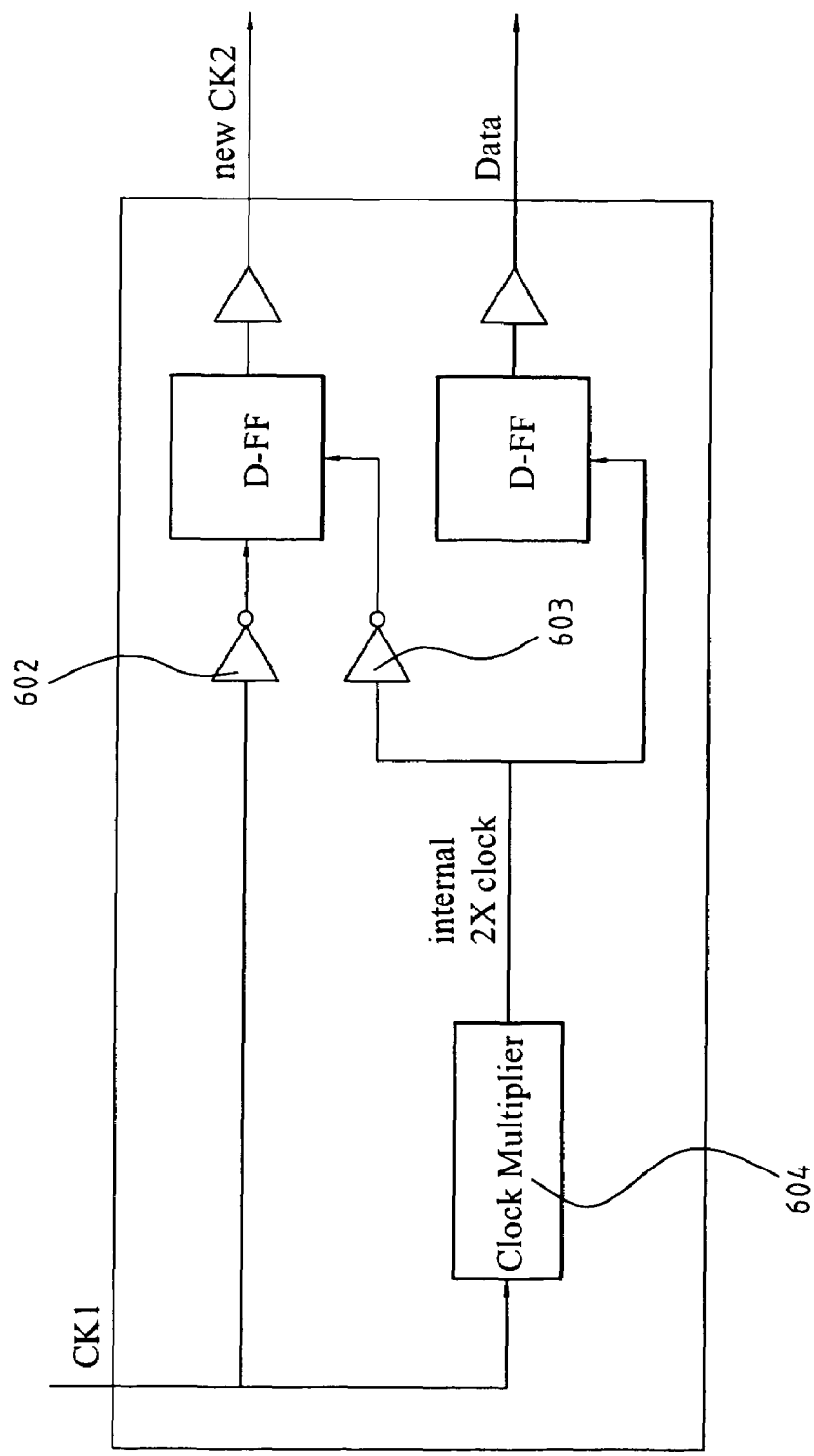
FIG. 6 shows an alternative simplified circuit diagram for the aligned clock forwarding scheme in which an inverse-phase clock is generated with an additional inverter.
Figure 7:
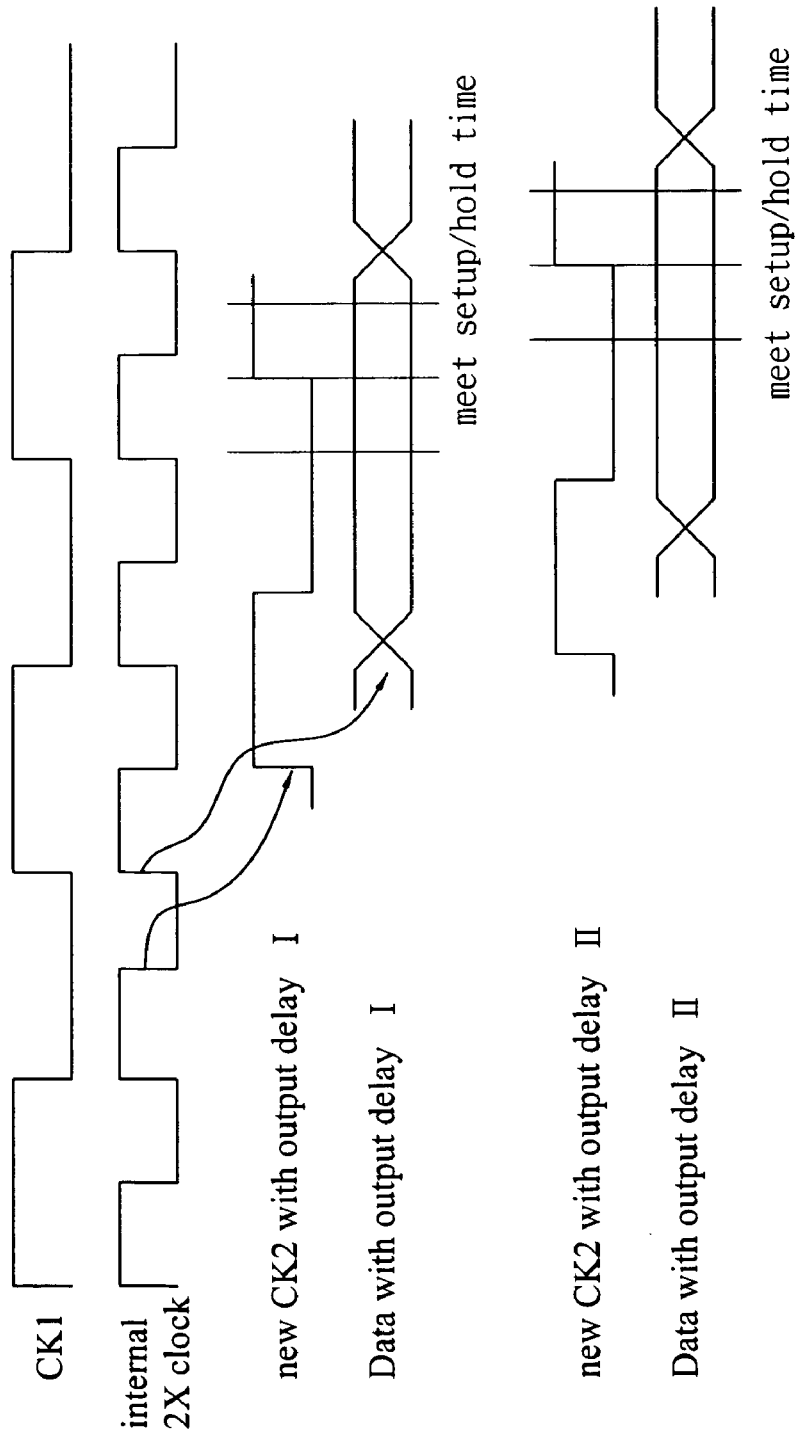
FIG. 7 shows the timing relationships between the transferred data and clock signals of the circuit diagram shown in FIG. 6.

FIG. 6 shows another simplified diagram for the aligned clock forwarding scheme according to this invention. In some case, it is desirable to generate a clock input with an inverse phase by using an additional inverter 603 as illustrated in FIG. 6. FIG. 7 shows the timing relationships between the transferred data and the clock signals corresponding to the circuit of FIG. 6. Two possible data transactions with output delays are shown, i.e., Data with output delay I and Data with output delay II, respectively. Both of them meet the setup and hold time timing requirement as shown in FIG. 7.

In the simplified circuit, the external clock signal is inverted by an inverter 602 before entering the output path of CK2. The circuit also comprises a clock multiplication circuit for generating multiplied clock signals to control the D flip-flops in the output paths of both data and CK2. The clock multiplication circuit includes a clock multiplier 604 which receives the external clock signal and sends a multiplied clock signal to the D flip-flop in the output path of the data. The inverter 603 receives the multiplied clock signal and sends an inverted multiplied clock signal to the D flip-flop in the output path of CK2.

Figure 8:
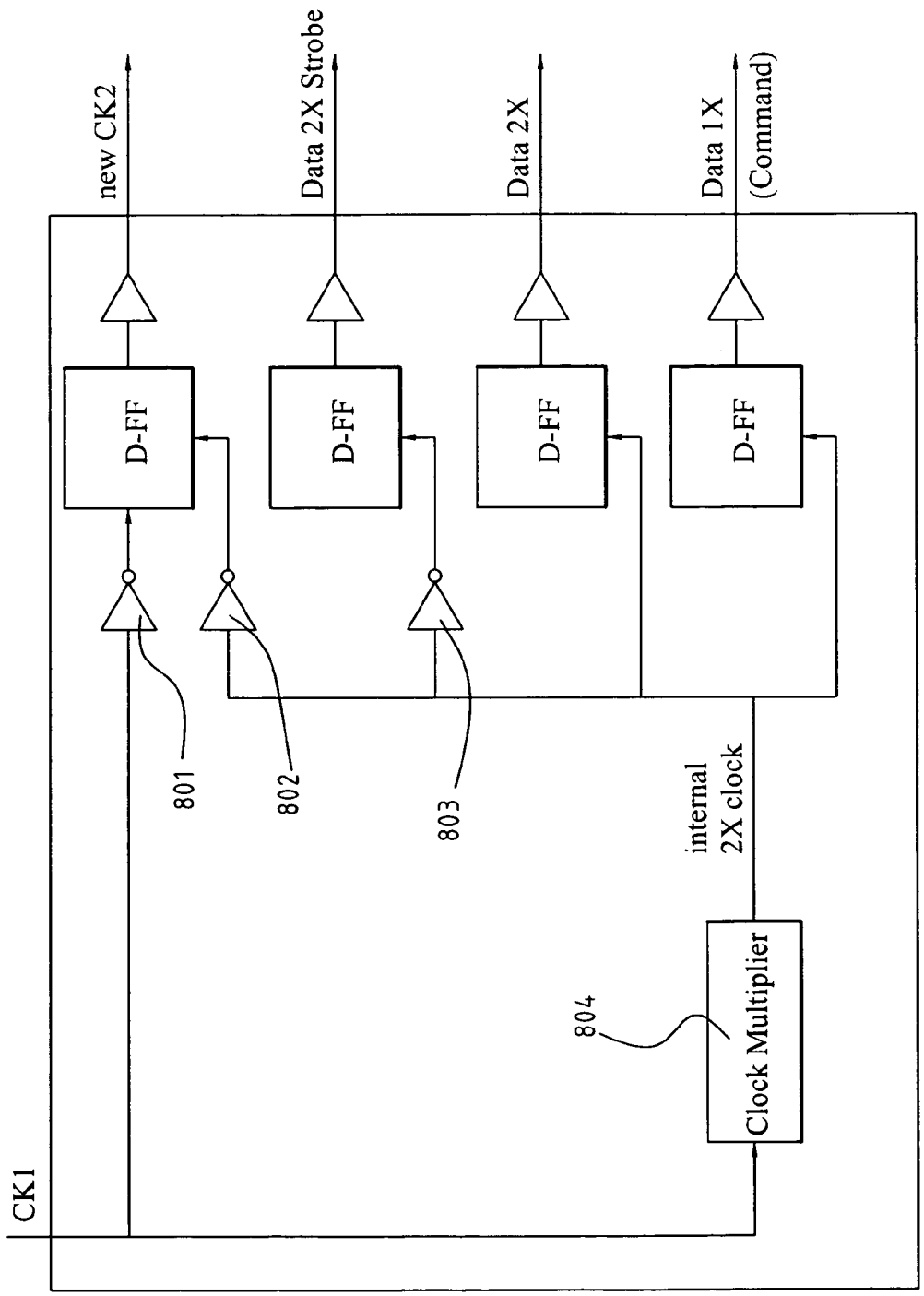
FIG. 8 shows an embodiment of the aligned clock forwarding scheme applied to the memory control scheme in a personal computer system based on the present invention.
Figure 9:
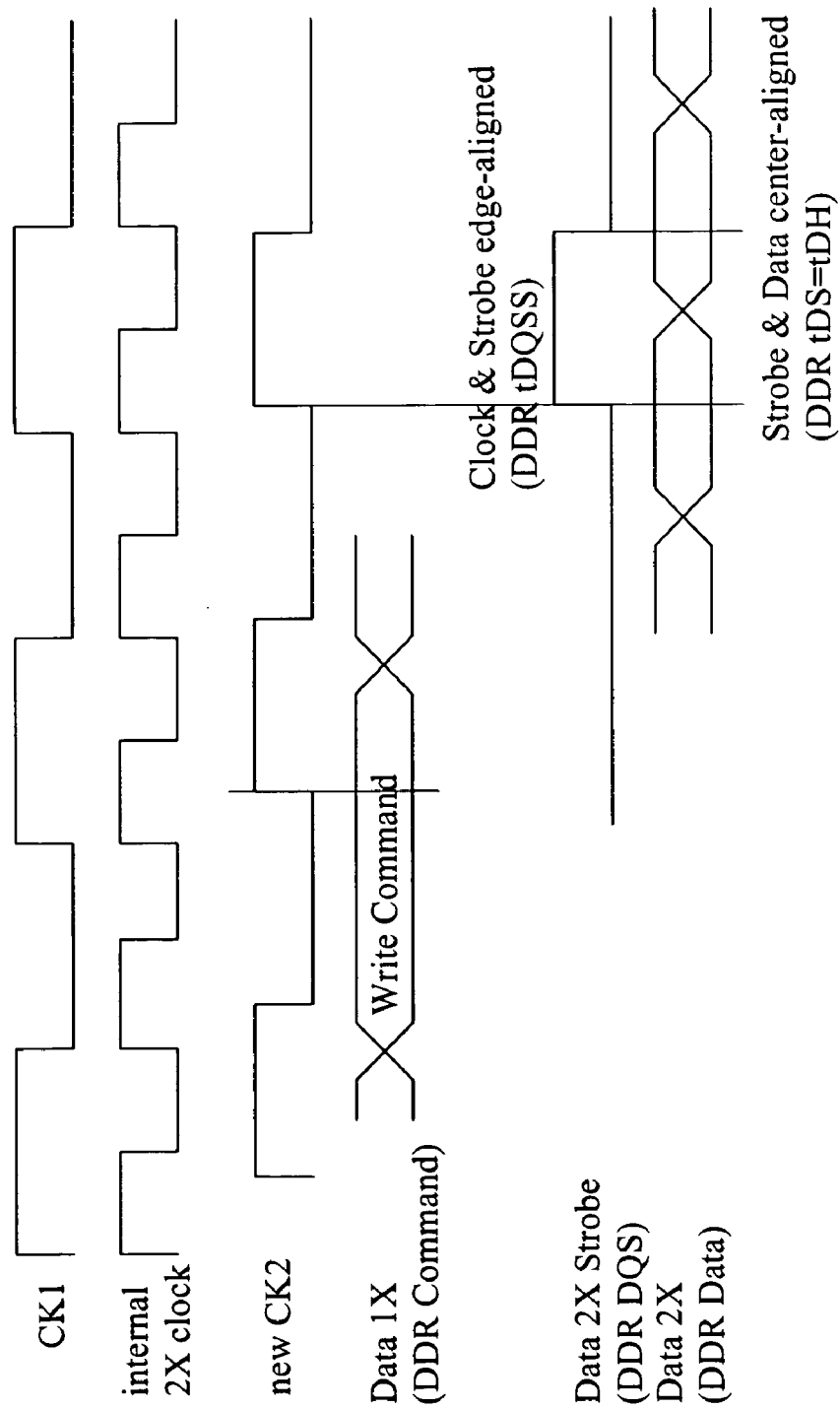
FIG. 9 shows the timing diagram of the embodiment in FIG. 8, which effectively maintains the precise and accurate timing relationship with the aligned clock forwarding scheme of the present invention.

With reference to FIG. 8, an aligned clock forwarding scheme of this invention is applied to a clock scheme of a memory control circuit. The architecture implemented in the aligned clock forwarding scheme is based on the FIG. 6 in which an inverse-phase clock is generated with an additional inverter. The timing relationship of the embodiment is shown in FIG. 9.

There are four output paths in the circuit of FIG. 8. The first output path generates a clock signal CK2, the second output path generates a data strobe signal, the third output path generates a 2X data signal and the fourth output path generates a 1X data signal. Each output path has a D flip-flop and an output buffer. An inverter 801 receives an external clock signal and sends an inverted clock signal to the first output path.

A clock multiplication circuit is used to generate multiplied clock signals for clocking the D flip-flops in the four output paths. The clock multiplication circuit includes a clock multiplier 804 which sends the multiplied clock signals to the D flip-flops in the third and fourth output paths. The inverter 802 inverts the multiplied clock signal and sends an inverted multiplied clock signal to the D flip-flop in the first output path. Similarly, another inverter 803 inverts the multiplied clock signal and sends an inverted multiplied clock signal to the D flip-flop in the second output path.

Based on the inverse-phase clock generated architecture, the Data 2X Strobe signal can be in phase with the new CK2 signal. In this manner, the Data 2X signal can be well controlled and maintained with the Strobe and Data center aligned in accordance with the timing requirement. The Data 1X can be well controlled as it has been shown in FIG. 7. The processing rate of the Data 2X signal is twice of the Data 1X signal, and the cooperation of Data 1X and Data 2X leads to high speed processing in the embodiment by using the present invention.

In summary, the signal paths of a data signal and a clock input according to the aligned clock forwarding scheme have the same physical characteristics such as output capacitance, resistance, inductance on a package and trace length on a board. Therefore, even if there are environmental changes such as voltage and temperature variation, both clock input and data signal experience the same effect. There is no additional skew between the two signals during the data transfer between two subsystems.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A circuit for generating aligned clock and data signals, comprising:
    a clock input;
    a clock multiplication circuit for receiving an external clock signal from said clock input and generating a multiplied clock signal;
    a first circuit path receiving said external clock signal and said multiplied clock signal and generating an aligned clock signal; and
    a second circuit path receiving said multiplied clock signal and generating an aligned data signal;
    wherein said first and second circuit paths comprise identical circuit components, and said aligned clock signal generated by said first circuit path serves as a clock signal for said aligned data signal generated by said second circuit path.

2. The circuit as claimed in claim 1, wherein said first and second circuit paths each comprise a D flip-flop for receiving said multiplied clock signal and an output buffer for buffering said aligned clock signal and said aligned data signal respectively.

3. The circuit as claimed in claim 1, wherein said clock multiplication circuit comprises a clock multiplier and an inverter.

4. A circuit for generating aligned clock and data signals, comprising:
- a clock input;
- an inverter receiving an external clock signal from said clock input and generating an inverted clock signal;
- a clock multiplication circuit receiving said external clock signal and generating a multiplied clock signal and an inverted multiplied clock signal;
- a first circuit path receiving said inverted clock signal and said inverted multiplied clock signal, and generating an aligned clock signal; and
- a second circuit path receiving said multiplied clock signal and generating an aligned data signal;
- wherein said first and second circuit paths comprise identical circuit components, and said aligned clock signal generated by said first circuit path serves as a clock signal for said aligned data signal generated by said second circuit path.

5. The circuit as claimed in claim 4, wherein said first and second circuit paths each comprise a D flip-flop for receiving said inverted multiplied clock signal and said multiplied clock signal respectively and an output buffer for buffering said aligned clock signal and said aligned data signal respectively.

6. The circuit as claimed in claim 5, said clock multiplication circuit further comprising a clock multiplier receiving said external clock signal and sending a multiplied clock signal to said D flip-flop in said second circuit path, and an inverter receiving said multiplied clock signal and sending an inverted multiplied clock signal to said D flip-flop in said first circuit path.

7. A circuit for generating aligned clock and data signals, comprising:
- a clock input;
- an inverter receiving an external clock signal from said clock input and generating an inverted clock signal;
- a clock multiplication circuit receiving said external clock signal and generating a multiplied clock signal and an inverted multiplied clock signal;
- a first circuit path receiving said inverted clock signal and said inverted multiplied clock signal, and generating an aligned clock signal;
- a second circuit path receiving said inverted multiplied clock signal and generating an aligned data strobe signal;
- a third circuit path receiving said multiplied clock signal and generating an aligned first data signal; and
- a fourth circuit path receiving said multiplied clock signal and generating an aligned second data signal;
- wherein said first, second, third and fourth circuit paths comprise identical circuit components, said aligned clock signal serves as a clock signal for said aligned first data signal and said aligned second data signal, and said aligned data strobe signal serves as a data strobe signal for said aligned first data signal and said aligned second data signal.

8. The circuit as claimed in claim 7, wherein said first, second, third and fourth circuit paths each comprise a D flip-flop for receiving said inverted multiplied clock signal or said multiplied clock signal and an output buffer for buffering said aligned clock signal, said aligned data strobe signal, said aligned first data signal and said aligned second data signal respectively.

9. The circuit as claimed in claim 8, said clock multiplication circuit further comprising a clock multiplication circuit receiving said external clock signal, sending a multiplied clock signal to said D flip-flops in said third and fourth circuit paths, and sending an inverted multiplied clock signal to said D flip-flops in said first and second circuit paths.

10. The circuit as claimed in claim 9, said clock multiplication circuit comprising a clock multiplier receiving said external clock signal and sending a multiplied clock signal to said D flip-flops in said third and fourth circuit paths, an inverter receiving said multiplied clock signal and sending an inverted multiplied clock signal to said D flip-flop in said first circuit path, and an inverter receiving said multiplied clock signal and sending an inverted multiplied clock signal to said D flip-flop in said second circuit path.

* * * * *